United States Patent
Narla et al.

(10) Patent No.: US 9,496,710 B2
(45) Date of Patent: Nov. 15, 2016

(54) RAPID SHUTDOWN SOLID STATE CIRCUIT FOR PHOTOVOLTAIC ENERGY GENERATION SYSTEMS

(71) Applicant: SolarCity Corporation, San Mateo, CA (US)

(72) Inventors: Sandeep Narla, San Mateo, CA (US); Alex Mayer, San Rafael, CA (US); Soren Jensen, San Rafael, CA (US)

(73) Assignee: SolarCity Corporation, San Mateo, CA (US)

( * ) Notice: Subject to any disclaimer, the term of this patent is extended or adjusted under 35 U.S.C. 154(b) by 0 days.

(21) Appl. No.: 14/681,705

(22) Filed: Apr. 8, 2015

(65) Prior Publication Data
US 2016/0190798 A1    Jun. 30, 2016

Related U.S. Application Data

(60) Provisional application No. 62/126,102, filed on Feb. 27, 2015, provisional application No. 62/097,195, filed on Dec. 29, 2014, provisional application No. 62/097,224, filed on Dec. 29, 2014.

(51) Int. Cl.
*H02H 7/20*    (2006.01)
*H02M 7/44*    (2006.01)
(Continued)

(52) U.S. Cl.
CPC ............. *H02H 7/20* (2013.01); *H02H 7/122* (2013.01); *H02J 1/00* (2013.01); *H02J 3/383* (2013.01); *H02M 7/44* (2013.01)

(58) Field of Classification Search
USPC ......................................................... 307/80
See application file for complete search history.

(56) References Cited

U.S. PATENT DOCUMENTS 7,929,324 B1 *   4/2011   Kernahan et al. ............... 363/65
7,969,133 B2 *   6/2011   Zhang et al. .................. 323/283
(Continued)

FOREIGN PATENT DOCUMENTS

EP      1 172 777 A2    1/2002
WO    2010/078303 A2    7/2010

OTHER PUBLICATIONS

International Search Report mailed on Apr. 4, 2016 for International Patent Application No. PCT/US2015/067742, 6 pages.
(Continued)

*Primary Examiner* — Thienvu Tran
*Assistant Examiner* — David M Stables
(74) *Attorney, Agent, or Firm* — Kilpatrick Townsend & Stockton LLP (57) ABSTRACT

A solid state circuit for performing rapid shutdown of a photovoltaic power generation system includes a pair of high voltage power transistors connected between a photovoltaic array and a pair of high voltage lines that function to supply power generated by the photovoltaic array to a DC to AC inverter. The solid state circuit further includes a control circuit configured so that when the photovoltaic power generation system operates under normal conditions, the control circuit maintains the pair of high voltage power transistors in the on state so that power produced by the photovoltaic array can be transmitted to the DC to AC inverter through the pair of high voltage lines. The control circuit is further configured so that upon receiving a rapid shutdown command, the control circuit turns off the pair of high voltage power transistors to thereby electrically disconnect the photovoltaic array from the pair of power lines.

20 Claims, 3 Drawing Sheets

(51) Int. Cl.
*H02J 1/00* (2006.01)
*H02H 7/122* (2006.01)
*H02J 3/38* (2006.01)

(56) References Cited

U.S. PATENT DOCUMENTS

| | | | | |
|---|---|---|---|---|
| 8,050,804 | B2* | 11/2011 | Kernahan | 700/298 |
| 8,139,382 | B2* | 3/2012 | Zhang et al. | 363/41 |
| 8,154,892 | B2* | 4/2012 | Kernahan | 363/65 |
| 8,239,149 | B2* | 8/2012 | Nuotio et al. | 702/65 |
| 8,279,644 | B2* | 10/2012 | Zhang et al. | 363/55 |
| 2006/0225779 | A1* | 10/2006 | Boulanger | 136/244 |
| 2008/0198523 | A1* | 8/2008 | Schmidt et al. | 361/88 |
| 2009/0134851 | A1* | 5/2009 | Takeda | H02M 3/07 323/234 |
| 2009/0251936 | A1* | 10/2009 | Kernahan | 363/131 |
| 2009/0261655 | A1* | 10/2009 | Kernahan | 307/77 |
| 2010/0001587 | A1* | 1/2010 | Casey | H01L 31/02021 307/80 |
| 2010/0071744 | A1 | 3/2010 | Peurach et al. | |
| 2010/0149847 | A1* | 6/2010 | Kernahan | 363/142 |
| 2011/0088741 | A1 | 4/2011 | Dunton et al. | |
| 2012/0033392 | A1* | 2/2012 | Golubovic | H02S 40/34 361/752 |
| 2012/0212064 | A1* | 8/2012 | Spanoche et al. | 307/82 |
| 2012/0215372 | A1* | 8/2012 | Kernahan et al. | 700/298 |
| 2012/0281444 | A1* | 11/2012 | Dent | 363/56.01 |

OTHER PUBLICATIONS

Written Opinion mailed on Apr. 4, 2016 for International Patent Application No. PCT/US2015/067742, 6 pages.

* cited by examiner

RAPID SHUTDOWN SOLID STATE CIRCUIT FOR PHOTOVOLTAIC ENERGY GENERATION SYSTEMS

CROSS-REFERENCES TO RELATED APPLICATIONS

This application claims the benefit of U.S. Provisional Application No. 62/126,102, filed Feb. 27, 2015, U.S. Provisional Application No. 62/097,195, filed Dec. 29, 2014, and U.S. Provisional Application No. 62/097,224, filed Dec. 29, 2014, the disclosures of which are incorporated by reference herein in their entirety.

FIELD OF THE INVENTION

The invention relates to photovoltaic energy generation systems and more specifically to systems, circuits and methods for rapidly shutting down the flow of electricity out of a photovoltaic panel ("solar panel"), a string of photovoltaic panels or an array of photovoltaic panels.

BACKGROUND OF THE INVENTION

In response to the increasing market adoption of residential and commercial solar in the United States and elsewhere, and in order to address safety concerns for fire fighters and other first responders who may have to get on the roof of a home or other structure that has photovoltaic panels that are actively generating electricity, amendment 690.12 to the National Electric Code now requires a so-called "rapid shutdown function" that renders the system harmless within a matter of seconds. Specifically, the code amendment requires a rapid shutdown function that controls specific conductors as follows: (1) requirements for controlled conductors shall only apply to PV system conductors of more than 5 FT inside a building or 10 FT from a PV array; (2) controlled conductors shall be limited to not more than 30 volts and 240 volt-amperes within 10 seconds of shutdown; (3) voltage and power shall be measured between any two conductors and between any conductor and ground; (4) the rapid shut down methods shall be labeled as such: PHOTOVOLTAIC SYSTEM EQUIPPED WITH RAPID SHUTDOWN (in white, capitalized, reflective letters on a red background); and equipment that performs the rapid shutdown shall be listed and identified. 2014 NEC 690.12.

In residential systems, the effect of this code requirement is that system installers/operators must provide a mechanism by which the conductive lines that supply the power produced by the PV array to the inverter (hereinafter referred to as "power lines") are disconnected from the PV array so that the power lines pose no risk of electric shock.

Typically, inverters will contain a DC power shutoff switch that prevents power generated by the PV array from flowing to the inverter. However, some jurisdictions may require a separate DC shutoff switch between the positive/negative PV power lines (that extend between the PV array and the inverter) and the inverter which, in the event of an emergency, could be shut off. Such a shutoff may be located in a separate box near an inverter. In still further jurisdictions, separate shutoff may be unnecessary because a first responder may simply pull the AC power meter out of the meter socket, or throw a breaker switch at or near the meter socket so that no electricity can flow into the system, thereby also shutting down any PV system inverters. Despite these existing shutoff mechanisms which either shut down the inverter or break the circuit between the inverter and the panels, there is still a need to rapidly cutoff flow of power from the array (so-called rapid shutdown), and in some cases there is also a need to discharge to a safe level any residual charge that remains on the positive/negative PV power lines.

There are existing implementations of the rapid shutdown function, but they suffer from various limitations that make them undesirable. For example, electrically controlled switches such as DC contactors or relays are in some cases used to effect rapid shutdown, however, these devices are relatively expensive, large in size, and prone to failure, making them unappealing for large scale implementation, in particular in an industry whose goal is to reduce the cost per kilowatt in order to be competitive with fossil-fuel-based energy.

BRIEF SUMMARY OF THE INVENTION

In accordance to one embodiment, a solid state circuit for performing rapid shutdown of a photovoltaic power generation system includes a pair of high voltage power transistors configured so that when the solid state circuit is integrated in the photovoltaic power generation system, the pair of high voltage power transistors is connected between a photovoltaic array and a pair of high voltage lines that function to supply power generated by the photovoltaic array to a DC to AC inverter. A control circuit is configured so that when the photovoltaic power generation system operates under normal conditions, the control circuit maintains the pair of high voltage power transistors in the on state so that power produced by the photovoltaic array can be transmitted to the DC to AC inverter through the pair of high voltage lines. The control circuit is further configured so that upon receiving a rapid shutdown command, the control circuit turns off the pair of high voltage power transistors to thereby electrically disconnect the photovoltaic array from the pair of power lines.

In one embodiment, the solid state circuit includes a power supply configured so that when the solid state circuit is integrated in the photovoltaic power generation system, the power supply converts a high voltage provided by the photovoltaic array to a lower voltage for powering the solid state circuit.

In another embodiment, the solid state circuit includes a detection circuit configured so that when the solid state circuit is integrated in the photovoltaic power generation system, the detection circuit detects a state of the DC to AC inverter, and in response provides a command to the control circuit.

In still another embodiment, the solid state circuit includes a discharge circuit configured so that when the solid state circuit is integrated in the photovoltaic power generation system, upon receiving the rapid shut down command, the discharge circuit discharges capacitors that are coupled to the pair of power lines.

In accordance with another embodiment, a photovoltaic power generation system includes a photovoltaic array, a DC to AC inverter, and a rapid shutdown solid state circuit connected between the photovoltaic array and a pair of high voltage lines that function to supply power generated by the photovoltaic array to the DC to AC inverter. The rapid shutdown solid state circuit includes a pair of high voltage power transistors connected between the photovoltaic array and the pair of high voltage lines, and a control circuit configured so that when the photovoltaic power generation system operates under normal conditions, the control circuit maintains the pair of high voltage power transistors in the on state so that power produced by the photovoltaic array can be transmitted to the DC to AC inverter through the pair of high voltage lines. The control circuit is further configured so that upon receiving a rapid shutdown command, the control circuit turns off the pair of high voltage power transistors to thereby electrically disconnect the photovoltaic array from the pair of power lines.

In accordance with still another embodiment, a method for rapidly shutting down a photovoltaic power generation system includes the following steps. A high voltage provided by a photovoltaic array is converted to a lower voltage for powering a rapid shutdown solid state circuit. The rapid shutdown solid state circuit includes power transistors coupled between the photovoltaic arrays and a pair of high voltage lines that function to supply power generated by the photovoltaic array to a DC to AC inverter. The rapid shutdown solid state circuit receives a rapid shutdown command, and in response the power transistors are turned off to thereby electrically disconnect the photovoltaic array from the pair of power lines.

In one embodiment, the method further includes discharging capacitors coupled to the pair of power lines after the power transistors are turned off.

DETAILED DESCRIPTION OF THE INVENTION

Figure 1:
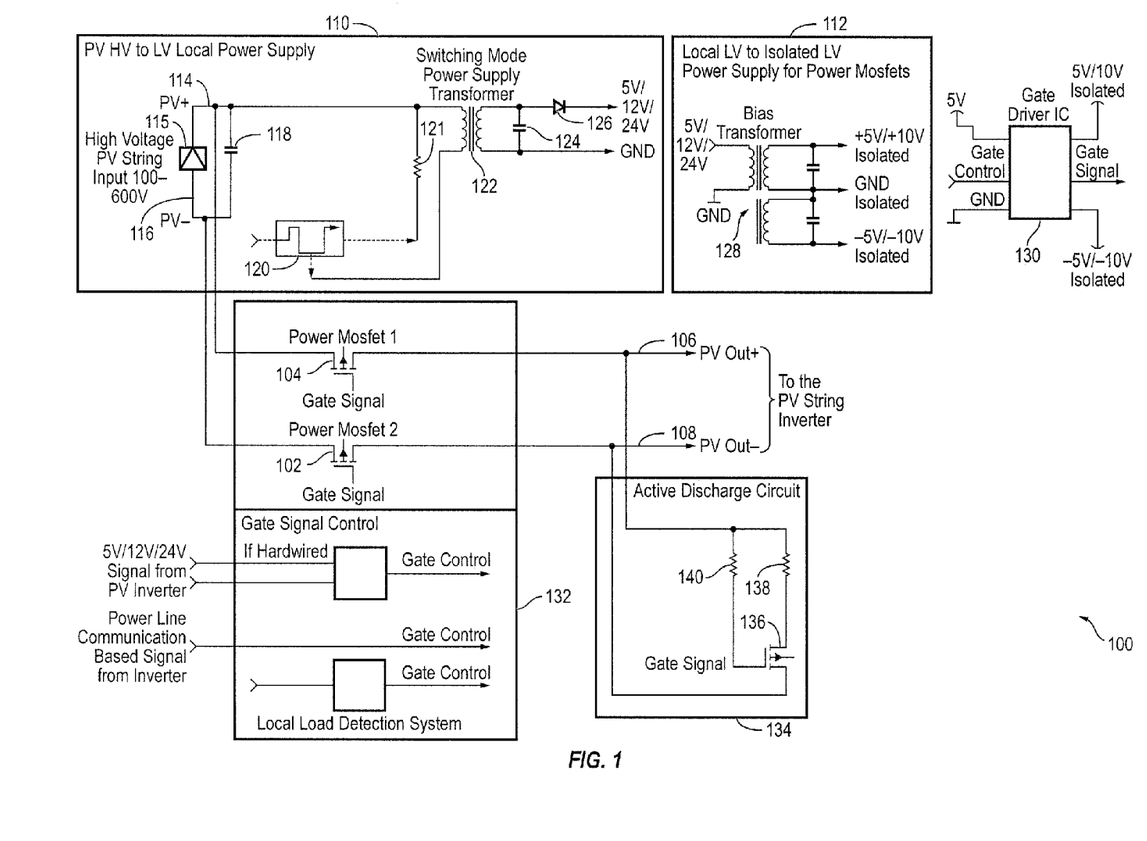
FIG. 1 illustrates a solid state circuit for performing rapid shutdown of a photovoltaic (PV) power generation system according to an exemplary embodiment.

In light of the shortcomings of existing rapid shutdown implementations, a solid state rapid shutdown circuit is disclosed that is much smaller and cheaper to manufacture and yet capable of accomplishing the rapid shutdown function. FIG. 1 illustrates a solid state circuit 100 for performing rapid shutdown of a photovoltaic (PV) power generation system according to an exemplary embodiment.

As illustrated in the exemplary embodiment shown in FIG. 1, rapid shutdown circuit 100 includes a pair of high power metal oxide semiconductor field effect transistors (MOSFETs) 102 and 104 which form a switching circuit that can selectively and rapidly shutoff the power output by a PV array 115 on positive and negative conductive power lines PV Out+ 106 and PV Out− 108 of a PV power generation system. It should be appreciated that although FIG. 1 illustrates power MOSFETs as switches 102 and 104, insulated-gate bipolar transistors (IGBTs), high power bipolar junction transistors (BJTs), or other suitable power devices may be used in place of MOSFETs 102 and 104 without departing from the spirit or scope of the invention. For example, the power transistors may be formed using superjunction architecture and/or silicon, silicon carbide or gallium nitride process technologies or any combination thereof. Further, while FIG. 1 shows only one power MOSFET for isolating each of power lines PV Out+ 106 and PV Out− 108 from PV array 115, two or more parallel-connected power devices (e.g., power MOSFETs) can be used in order to minimize the voltage drop across switches 102 and 104 and to distribute the heat dissipated in the switches among multiple transistors. Moreover, rapid shutdown circuit 100 may be physically disposed at the end of a PV string or at the end of, or inside a combiner box combining the voltages of multiple PV strings. In some embodiments, the ordinary state of switches 102 and 104 is open (i.e., the MOSFETs are off or in non-conducting state), however, when the PV system is generating power, switches 102 and 104 are kept closed (i.e., the MOSFETs are kept in the on or conducting state) so that power generated by the PV system is permitted to flow through the switches to the inverter(s).

In some embodiments, power switches 102,104 may be powered by an integral power supply which receives its power from the PV string or array 115. FIG. 1 shows an exemplary power supply that includes a high voltage (HV) to low voltage (LV) power supply block 110 and a low voltage to isolated low voltage power supply block 112. Power supply block 110 receives power from PV array 115 via conductive power lines PV+ 114 and PV− 116, and generates one or more low voltages. In some embodiments, PV array 115 provides a voltage in the range of 100V-600V, and power supply block 110 converts this voltage to a lower voltage, such as 5V, 12V or 24V. Power supply block 110 includes an electrolytic capacitor 118 coupled across conductive power lines PV+ 114 and PV− 116. Power supply block 110 further includes a voltage regulator 120 that regulates the voltage provided by PV array 115 to a lower voltage provided to a switching mode power supply transformer 122. An auxiliary supply capacitor 124 is coupled across transformer 122, and a protection diode 126 is coupled to an output of power supply block 110.

LV to isolated LV power supply block 112 receives the voltage provided by power supply block 110 and in turn provides isolated low voltages (e.g., +5V, +10V, −5V or −10V) and isolated ground potential for use in low voltage circuits. Power supply block 112 includes a bias transformer 128, and provides 100% galvanic isolation preventing feedthrough of high DC voltages to the low voltage circuits. Power supply blocks 110 and 112 require a small amount of power for proper operation and therefore do not meaningfully reduce the amount of power generated by the PV system. In an alternative embodiment, local low-voltage power supply 112 may comprise a battery or other long term power storage device that does not need to draw continuous power from PV array 115, instead of being derived from the main high voltage to low voltage power supply 110.

The exemplary rapid shutdown circuit 100 further includes a gate driver circuit 130 that is powered by LV to isolated LV power supply block 112. Gate driver circuit 130 receives a gate control signal from gate signal control block 132 and in response generates gate signals with appropriate voltage levels that are routed to the gates of MOSFETs 102, 104. Gate driver circuit 130 may be a conventional power amplifier that functions to produce a high-current drive output for driving the gates of MOSFETs 102, 104 from a low power input signal such as the gate control signal provided by block 132. In one exemplary embodiment, power MOSFETs 102 and 104 are capable of withstanding 600V and conducting up to 25A with an on-resistance of 3 mΩ.

Gate signal control block 132 generates an appropriate gate control signal in response to one or more commands it receives. For example, gate signal control block 132 may receive a command from the PV inverter via dedicated wire lines (e.g., positive and negative wire lines). Alternatively, block 132 may receive a command via the conductive power lines PV Out+ and PV Out− that extend between the PV array and the inverter. Gate signal control block 132 may also generate an appropriate gate control signal in response to local load detection (e.g., by measuring the current through conductive power lines PV Out+ and PV Out−).

The operation of transistor switches 102, 104 is dictated by the voltage level applied to the gate terminals of the MOSFETs. When power stops flowing from the PV system (e.g., at night), rapid shutdown circuit 100 will no longer be powered and thus transistors 102, 104 return to their open state. During day time when the PV system generates power, switches 102, 104 are closed thus allowing power generated by the PV array to flow through to the inverter. If rapid shutdown circuit 100 receives a rapid shutdown command, gate signal control block 132 provides an appropriate gate control signal to gate driver circuit 130 which in turn generates one or more gate signals that cause MOSFETs 102, 104 to open, thereby electrically disconnecting PV array 115 from power lines PV Out+ 106 and PV Out− 108.

Exemplary rapid shutdown circuit 100 also includes a discharge circuit 134 that may include a low voltage, high current MOSFET 136. In one exemplary embodiment, MOSFET 136 is constructed using surface-mount technology (SMT). While FIG. 1 shows one MOSFET used for the discharge function, multiple parallel-connected MOSFETs may be used to speed up the discharge rate and/or to distribute the heat generated during the discharge period among multiple transistors. MOSFET 136 has its drain connected to the positive conductive power line PV Out+ 106 through a high power discharge resistor 138, its gate connected to the positive power line PV Out+ 106 through another resistor 140, and its source connected to the negative conductive power line PV Out− 108. This configuration enables rapid and automatic discharge of the charge stored on the inverter input capacitors (not shown) when switches 102, 104 are opened in response to the rapid shutdown command, as described next. Once switches 102, 104 are opened in response to the rapid shutdown command, inverter input capacitors start to discharge through conductive power lines PV Out+ 106 and PV Out− 108. Resistor values for resistors 138 and 140 may be selected such that the initial drop in power lines PV Out+ 106 and PV Out− 108 causes MOSFET 136 to turn on, and once turned on, MOSFET 136 rapidly discharges any power stored on the inverter input capacitors through power lines PV Out+ 106 and PV Out− 108.

Discharge circuit 134 ensures the 2014 NEC 690.12 requirement that conductive power lines 106, 108 be limited to not more than 30 volts and 240 volt-amperes within 10 seconds of shutdown is met. Depending on the size of the inverter input capacitors, an appropriate resistor value is selected for high power discharge resistor 138 so that the resulting RC time constant meets the discharge rate requirements. It is noted that once the voltages on PV Out+ 106 and PV Out− 108 drop to relatively low levels (e.g., below 30V), MOSFET 136 turns off. Once MOSFET 136 turns off, any remaining charge is fully discharged through discharge resistor 138. It is noted that resistor 138 can comprise multiple parallel-connected resistors to spread the power dissipation.

In one variation of discharge circuit 134, discharge MOSFET 136 is not automatically turned on and off as described above. Instead, MOSFET 136 is controlled by gate driver block 130 which generates an appropriate signal that is routed to the gate of MOSFET 136. In this embodiment, gate driver 130 is designed to generate gate signals for MOSFETs 102 and 104 and for discharge MOSFET 136 such that when MOSFETs 102 and 104 are open (i.e., are in the off state), MOSFET 136 is closed (i.e., is in the on state), and vice versa. It is noted that in systems with a DC disconnect available at the inverter, discharge circuit 134 may be omitted. This is because when the DC disconnect switch is opened, the capacitors at the inverter input are disconnected from the conductive power lines PV Out+ 106 and PV Out− 108. In systems with only an AC disconnect, the discharge circuit is necessary in order to discharge the inverter input capacitors after power switches 102 and 104 are opened.

Rapid shutdown circuit 100 may take various physical forms, however, in at least one embodiment, the circuit may be mounted on a single printed circuit board (PCB) encased in a weather proof box or other enclosure that is mounted on or near one of the PV modules making up a PV array. In some embodiments, this will be the most positive or most negative module in the string. In some embodiments, there will be one such box for each string of the array. In other embodiments, there may be only a single shutdown circuit in a combiner box that services all strings of the array. In still further embodiments, there may be one rapid shutdown circuit for each module in the array or a subset of modules in the array (i.e., n/2, n/3, n/4, etc., where n is the number of PV modules in the array). In other embodiments, power MOSFETs 102 and 104 are mounted to enclosed heat sink or to a mechanical chassis to dissipate the continuous conduction losses during normal operation of the PV system.

In some embodiments, the enclosure containing the rapid shutdown circuit may be located at or near the last module in a string, that is, the module with the most positive or negative voltage level in the string. It may be clamped to a frame of the last module of the string or attached to a groove in a frame of the last module depending on the type of module used. In some embodiments, the rapid discharge circuit inside the enclosure may take the form of the circuit shown in FIG. 1. For example, the circuit may include a power supply, such as the constant output voltage power supply of FIG. 1. This power supply may include a DC string high voltage input (typically ranging from 100V to 600V) wired in parallel with a relatively high capacitance capacitor. The power supply may also include a voltage regulator connected to a high impedance resistor divider circuit 121 to reduce the magnitude of the voltage and a power supply transformer. Those of ordinary skill in the art will recognize that various other power supply circuit designs could be used to obtain the high voltage to low voltage power supply without departing from the spirit or scope of the invention. In some embodiments, the voltage regulator controls the power supply voltage under variable load conditions and may comprise a low cost processor capable of monitoring the status of the inverter or receiving instructions from the inverter.

In some embodiments, discharge circuit 134 may be located in the same enclosure as the remainder of the rapid shut down circuit 110, however, it should be appreciated that in other embodiments it may be located in a separate enclosure. Also, the rapid shutdown circuit 100, including discharge circuit 134, may be formed on one printed circuit board. Alternatively, discharge circuit 134 may be formed on a board separate from the board on which the rest of rapid discharge circuit 100 is formed.

Figure 2:
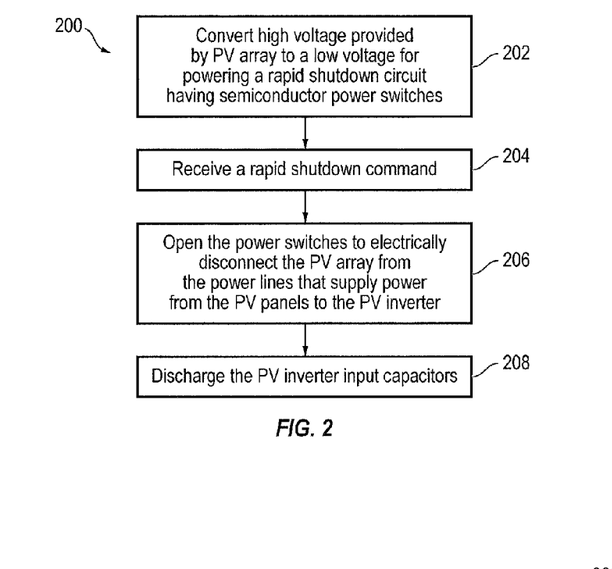
FIG. 2 is a flow chart showing the operation of the rapid shutdown circuit according to one embodiment.

FIG. 2 is a flow chart 200 showing the operation of the rapid shutdown circuit according to one embodiment. In step 202, a power supply circuit converts a high voltage provided by a PV array to a lower voltage that can be used to power a rapid shutdown solid state circuit. In step 204, the rapid shutdown circuit receives a rapid shutdown command. In step 206, in response to the rapid shutdown command, semiconductor power switches, such as power MOSFETs, in the rapid shutdown circuit are opened to electrically disconnect the PV array from the conductive power lines that supply power from the PV array to the PV inverter. In step 208, a discharge circuit may be activated to discharge the power stored on the inverter input capacitors. In one embodiment, the discharge circuit is configured to automatically activate when the conductive power lines are disconnected from the PV array. In another embodiment, a control signal generated from the rapid shutdown command activates the rapid shutdown circuit. In applications with a DC disconnect switch, the discharging step (step 208) may be omitted, as described above.

Figure 3:
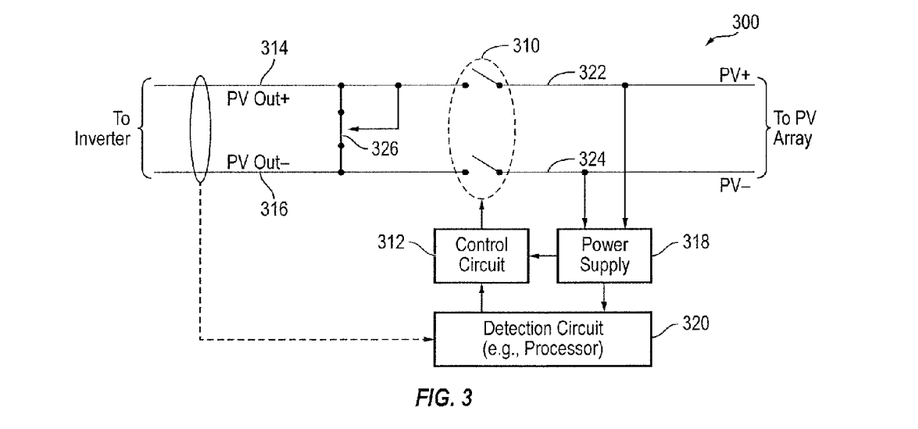
FIG. 3 is a block diagram illustrating a general architecture of the rapid shutdown solid state circuit according to one embodiment.

FIG. 3 is a block diagram illustrating a general architecture of a rapid shutdown solid state circuit 300 according to one embodiment. Rapid shut down circuit 300 contains a pair of power switches 310 connected between a PV array and conductive power lines PV Out+ 314 and PV Out− 316 that supply the power produced by the PV array to a PV inverter (not shown). Power switches 310 are controlled by a control circuit 312. Control circuit 312 receives one or more commands from a detection circuit 320 that may include a processor. In some embodiments, detection circuit 320 can detect the state of the inverter (e.g., whether or not it is powered, running, etc.) and control the operation of switches 310 via control circuit 312 according to the detected state of the inverter. In some embodiments, detection circuit 320 monitors a line from the inverter or a level of voltage on the PV string to determine the state of the inverter. Rapid shutdown circuit 300 further includes a power supply 318 which converts the high voltage produced by the PV array on power lines PV+ 322 and PV− 324 to a lower voltage that can be used to power control circuit 312 and detection circuit 320. It is noted that power supply 318 receives voltages on power lines PV+ 322 and PV− 324 and thus continues to provide power to control circuit 312 and detection circuit 320 even after the shutdown command is received. Power supply 318 stops operating during time periods when the PV array does not produce power (e.g., at night), although a battery can be used to maintain power supply 318 in operating condition during such periods.

In ordinary operation, power from the PV string or array is used to run power supply 318 which in turn is used to power control circuit 312 and detection circuit 320. Under normal conditions when the PV array is generating power, control circuit 312 operates to keep switches 310 closed so that power generated by the PV array passes to the inverter unimpeded. When detection circuit 320 detects a rapid shutdown command generated by, for example, the PV inverter, detection circuit 320 issues an appropriate command to control circuit 312. Control circuit 312 in response to the command issued by detection circuit 320 generates a control signal that causes power switches 310 to open, thus disconnecting conductive power lines PV Out+ 314 and PV Out− 316 from the PV array. The rapid shut down sequence may be triggered by a grid power outage, by pulling the meter, opening the DC disconnect switch at the inverter, or otherwise shutting down operation of the inverter. In some embodiments, detection circuit 320 detects the state of the inverter (e.g., whether it is powered, running, etc.) and controls the operation of switches 310 via control circuit 312. In other embodiments, detection circuit 320 monitors a line from the inverter or a level of voltage on the PV string.

Alternatively, the inverter may send a command up one of the power lines PV Out+ 314 and PV Out− 316 or on one or more dedicated lines that instructs detection circuit 320 to cause control circuit 312 to open switches 310 and thereby rapidly shut down the flow of power from the PV array to the inverter. In still further embodiments, the inverter may send a signal wirelessly to a receiver or transceiver in detection circuit 320 using a suitable wireless communication protocol such as WiFi or Bluetooth.

In some embodiments, a discharge switch 326, which under ordinary operating conditions is in an open (or non-conducting) state, is closed during a rapid shutdown sequence in order to discharge the power stored on the inverter input capacitors. In the embodiment shown in FIG. 3, discharge switch 326 is controlled by power line PV Out+ 322, and thus automatically opens and closes depending on the state of the power line PV Out+ 322. In an alternate embodiment, discharge switch 326 is controlled by control circuit 312. In this embodiment, control circuit 312 generates appropriate control signals for power switches 310 and discharge switch 326 such that when power switches 310 are open (i.e., are non-conducting), discharge switch 326 is closed (i.e., is in the on state), and vice versa. Discharge switch 326 may be omitted in systems equipped with a DC disconnect at the inverter.

Figure 4:
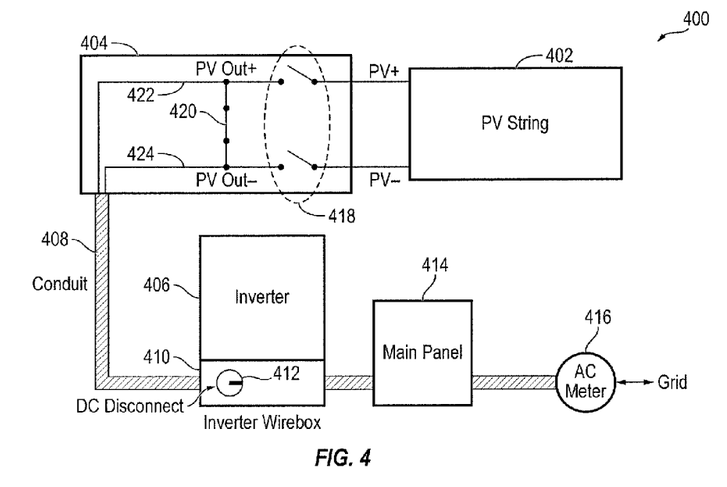
FIG. 4 shows an implementation of the rapid shutdown technique at the system level, according to one embodiment.

FIG. 4 shows an implementation of the rapid shutdown technique at the system level, according to one embodiment. System 400 includes at one end, a string of photovoltaic panels 402 (e.g., two or more panels serially connected on positive and negative lines), a rapid shutdown solid state circuit 404 according to various embodiments disclosed herein, a section of conduit 408 containing power conductors extending between rapid shutdown circuit 404 and inverter 406, an inverter wirebox 410, a DC disconnect 412 if present, an AC main panel 414, and an AC meter 416 connected to grid power.

As shown in FIG. 4, rapid shutdown circuit 404 includes high power switches 418 which may be made up of high power MOSFETs that are normally in the open or non-conducting position. In one embodiment, the operation of switches 418 is regulated by the voltage applied to the gate terminal of the power MOSFETs in response to commands received by rapid shutdown circuit 404. Rapid shutdown circuit 404 may also include a discharge switch 420 (e.g., a low voltage, high current MOSFET) configured so that after power MOSFETs 418 are opened, discharge switch 420 discharges any power stored on the inverter input capacitors by shorting power lines PV Out+ 422 and PV Out− 426, thus bleeding off any remaining power to a safe level, and ideally to zero, in under 10 seconds. As discussed above, the rapid shut down sequence performed by the rapid shutdown solid state circuit according to the various embodiments described herein may be triggered by a grid power outage, by pulling the meter, opening the disconnect, or otherwise shutting down operation of the inverter.

Figure 5:
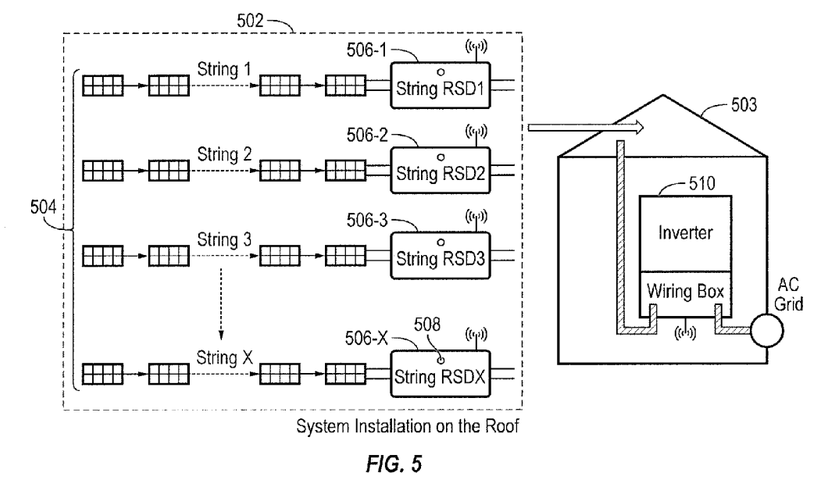
FIG. 5 illustrates additional features of various embodiments of the rapid shut down solid state circuit, according to exemplary embodiments.

FIG. 5 illustrates additional features of various embodiments of the rapid shut down solid state circuit, including a visual indicator that indicates the state of the power switches in each rapid shut down circuit (i.e., whether the power transistor switches are closed or conducting current). FIG. 5 shows a PV system installation 502 on the roof of a building structure 503. System 502 includes a number of PV strings 504 each having an independent rapid shutdown (RSD) circuit 506. Each RSD circuit 506 may include a LED indicator 508 that is powered by the PV array. For example, a green LED may be illuminated when the power transistor switches in the corresponding RSD circuit are closed (i.e., are in conducting state). By contrast, a red LED may be illuminated when the input and output connections of the RSD circuit are incorrectly connected or connected in reverse. In various embodiments, when there is no array power, the LED indicator(s) 508 may simply be off. For example, when it is dark out or after the system has been shut down and discharged, LEDs 508 may be turned off and thus not illuminating either red or green.

Another feature shown in FIG. 5 is communication capability between each RSD circuit 506 and inverter 510. This could be accomplished using wireless communication (e.g., via WiFi or Bluetooth) with an integral antenna and transceiver at each RSD 506 and the inverter 510. Alternatively, power line communication (PLC) could be utilized to communicate over one or more of the DC power lines spanning between each RSD 506 and inverter 510.

The ability to communicate to inverter 510 allows the inverter to "know" and be able to report the status of each PV string. In the event of a fire or other events that necessitate access to the array during daylight hours, this also allows inverter 510 to send a shutdown signal, e.g., either wireless or via the power line, to each RSD circuit instructing it to perform a shutdown in the manner described above.

The embodiments described herein are not to be limited in scope by the specific embodiments described above. Indeed, various modifications of the embodiments, in addition to those described herein, will be apparent to those of ordinary skill in the art from the foregoing description and accompanying drawings. Further, although some of the embodiments have been described herein in the context of a particular implementation in a particular environment for a particular purpose, those of ordinary skill in the art will recognize that their usefulness is not limited thereto and that they can be beneficially implemented in any number of environments for any number of purposes. Accordingly, the disclosure should be construed in view of the full breath and spirit of the embodiments as disclosed herein.

What is claimed is:

1. A rapid shutdown solid state circuit for a photovoltaic power generation system, the rapid shutdown solid state circuit comprising:
    a pair of high voltage power transistors configured so that when the rapid shutdown solid state circuit is integrated in the photovoltaic power generation system, the pair of high voltage power transistors is connected between a photovoltaic array and a pair of high voltage lines comprising a positive conductive power line and a negative conductive power line that supply power generated by the photovoltaic array to a DC to AC inverter, each transistor of the pair of high voltage power transistors being disposed along a respective conductive power line of the pair of high voltage lines, wherein the pair of high voltage power transistors are disposed closer to the photovoltaic array than the DC to AC inverter;
    a control circuit configured so that when the photovoltaic power generation system operates under normal conditions, the control circuit maintains the pair of high voltage power transistors in the on state so that power produced by the photovoltaic array can be transmitted to the DC to AC inverter through the positive and negative conductive power lines, the control circuit being further configured so that upon receiving a rapid shutdown command, the control circuit turns off the pair of high voltage power transistors to thereby electrically disconnect the photovoltaic array from the positive and negative conductive power lines to prevent further flow of power from the photovoltaic array to the positive and negative conductive power lines; and
    a discharge circuit coupled to discharge the positive and negative conductive power lines when activated, wherein when the rapid shutdown solid state circuit is integrated in the photovoltaic power generation system, the pair of high voltage transistors are connected between the photovoltaic array and the discharge circuit.

2. The rapid shutdown solid state circuit according to claim 1 further comprising a power supply configured so that when the rapid shutdown solid state circuit is integrated in the photovoltaic power generation system, the power supply converts a high voltage provided by the photovoltaic array to a lower voltage for powering the rapid shutdown solid state circuit.

3. The rapid shutdown solid state circuit according to claim 1 further comprising a detection circuit configured so that when the rapid shutdown solid state circuit is integrated in the photovoltaic power generation system, the detection circuit detects a state of the DC to AC inverter, and in response provides a command to the control circuit for controlling a state of each transistor of the pair of high voltage power transistors.

4. The rapid shutdown solid state circuit according to claim 1 wherein the discharge circuit is further configured so that when the rapid shutdown solid state circuit is integrated in the photovoltaic power generation system, upon receipt of the rapid shut down command, the discharge circuit discharges capacitors coupled to inputs of the DC to AC inverter.

5. The rapid shutdown solid state circuit according to claim 1 wherein the discharge circuit includes a transistor having a drain coupled to a first one of the pair of high voltage lines through one or more discharge resistors, a source coupled to a second one of the pair of high voltage lines, and a gate coupled to the first one of the pair of high voltage lines through a resistor.

6. The rapid shutdown solid state circuit according to claim 1 wherein the discharge circuit includes a discharge transistor coupled between the pair of high voltage lines, the control circuit being configured so that upon receiving the rapid shutdown command, the control circuit applies a first voltage to a gate terminal of the discharge transistor to turn on the discharge transistor.

7. The rapid shutdown solid state circuit according to claim 1 wherein each transistor of the pair of high voltage power transistors includes multiple parallel-connected power MOSFETs.

8. The rapid shutdown solid state circuit according to claim 1 further comprising at least one status indicator LED.

9. The rapid shutdown solid state circuit according to claim 1 further comprising a wireless antenna and a transceiver configured so that when the rapid shutdown solid state circuit is integrated in the photovoltaic power generation system, the rapid shutdown solid state circuit is operable to wirelessly communicate with the DC to AC inverter.

10. The rapid shutdown solid state circuit according to claim 1 further comprising a modem configured so that when the rapid shutdown solid state circuit is integrated in the photovoltaic power generation system, the rapid shutdown solid state circuit is operable to send a signal indicating the current status of the rapid shutdown solid state circuit via an output of the rapid shutdown solid state circuit that is connected to the DC to AC inverter.

11. A photovoltaic power generation system comprising:
a photovoltaic array;
a DC to AC inverter; and
a rapid shutdown solid state circuit connected between the photovoltaic array and a pair of high voltage lines comprising a positive conductive power line and a negative conductive power line that supply power generated by the photovoltaic array to the DC to AC inverter, the rapid shutdown solid state circuit comprising:
   a pair of high voltage power transistors connected between the photovoltaic array and the positive and negative conductive power lines, each transistor of the pair of high voltage power transistors being disposed along a respective conductive power line of the pair of high voltage lines, wherein the pair of high voltage power transistors are disposed closer to the photovoltaic array than the DC to AC inverter;
   a control circuit configured so that when the photovoltaic power generation system operates under normal conditions, the control circuit maintains the pair of high voltage power transistors in the on state so that power produced by the photovoltaic array can be transmitted to the DC to AC inverter through the positive and negative conductive power lines, the control circuit being further configured so that upon receiving a rapid shutdown command, the control circuit turns off the pair of high voltage power transistors to thereby electrically disconnect the photovoltaic array from the positive and negative conductive power lines to prevent further flow of power from the photovoltaic array to the positive and negative conductive power lines; and
   a discharge circuit coupled to discharge the pair of high voltage lines when activated, wherein when the rapid shutdown solid state circuit is integrated in the photovoltaic power generation system, the pair of high voltage transistors are connected between the photovoltaic array and the discharge circuit.

12. The photovoltaic power generation system according to claim 11 wherein the rapid shutdown solid state circuit further comprises a power supply configured to convert a high voltage provided by the photovoltaic array to a lower voltage for powering the rapid shutdown solid state circuit.

13. The photovoltaic power generation system according to claim 11 wherein the rapid shutdown solid state circuit further comprises a detection circuit configured to detect a state of the DC to AC inverter, and in response provide a command to the control circuit for controlling a state of each transistor of the pair of high voltage power transistors.

14. The photovoltaic power generation system according to claim 11 wherein the discharge circuit is further configured so that upon receipt of the rapid shut down command, the discharge circuit discharges capacitors coupled to inputs of the DC to AC inverter.

15. The photovoltaic power generation system according to claim 11 wherein the discharge circuit includes a transistor having a drain coupled to a first one of the pair of high voltage lines through one or more discharge resistors, a source coupled to a second one of the pair of high voltage lines, and a gate coupled to the first one of the pair of high voltage lines through a resistor.

16. The photovoltaic power generation system according to claim 11 wherein the discharge circuit includes a discharge transistor coupled between the pair of high voltage lines, the control circuit being configured so that upon receiving the rapid shutdown command, the control circuit applies a first voltage to a gate terminal of the discharge transistor to turn on the discharge transistor.

17. A method of operating a rapid shutdown solid state circuit for a photovoltaic power generation system, the method comprising:
   converting a high voltage provided by a photovoltaic array to a lower voltage for powering the rapid shutdown solid state circuit, the rapid shutdown solid state circuit including a pair of high voltage power transistors configured so that when the rapid shutdown solid state circuit is integrated in a photovoltaic power generation system, the pair of high voltage power transistors are coupled between the photovoltaic array and a pair of high voltage lines, the pair of high voltage lines comprising a positive conductive power line and a negative conductive power line that supply power generated by the photovoltaic array to a DC to AC inverter, each transistor of the pair of high voltage power transistors being disposed along a respective conductive power line of the pair of high voltage lines, wherein the pair of high voltage power transistors are disposed closer to the photovoltaic array than the DC to AC inverter;
   receiving a rapid shutdown command;
   turning off the pair of high voltage power transistors in response to the rapid shutdown command to thereby electrically disconnect the photovoltaic array from the positive and negative conductive power lines to prevent further flow of power from the photovoltaic array to the positive and negative conductive power lines; and
   activating a discharge circuit to discharge the positive and negative conductive power lines.

18. The method of claim 17 wherein the discharge circuit discharges capacitors coupled to the pair of power lines after the pair of high voltage transistors are turned off.

19. The method of claim 18 wherein the discharge circuit includes a power transistor coupled between the pair of high voltage lines for discharging the capacitors.

20. The method of claim 17 further comprising:
   detecting a state of the DC to AC inverter; and
   in response to the detecting step, providing a control signal for controlling a state of the pair of high voltage power transistors.

* * * * *